(12) United States Patent
Nakanishi et al.

(10) Patent No.: US 6,903,729 B2
(45) Date of Patent: Jun. 7, 2005

(54) TOUCH PANEL AND ELECTRONIC APPARATUS USING THE SAME

(75) Inventors: Akira Nakanishi, Osaka (JP); Nobuhiro Yamaue, Osaka (JP); Shigeyuki Fujii, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 236 days.

(21) Appl. No.: 10/263,722

(22) Filed: Oct. 4, 2002

(65) Prior Publication Data
US 2003/0071796 A1 Apr. 17, 2003

(30) Foreign Application Priority Data
Oct. 4, 2001 (JP) ........................................ 2001-308307

(51) Int. Cl.$^7$ ................................................. G09G 5/00
(52) U.S. Cl. .................... 345/173; 178/18.01; 178/18.1; 349/12
(58) Field of Search .............................. 349/12, 79, 80, 349/96; 345/173, 174, 175, 176, 177, 178, 179, 104, 87, 88; 178/18.01, 18.1

(56) References Cited
U.S. PATENT DOCUMENTS

| | | | | |
|---|---|---|---|---|
| 5,955,198 A | * | 9/1999 | Hashimoto et al. | 428/414 |
| 6,063,174 A | * | 5/2000 | Shirota et al. | 106/31.27 |
| 6,348,770 B1 | * | 2/2002 | Nishizawa et al. | 315/366 |
| 6,359,380 B1 | * | 3/2002 | Nishizawa et al. | 313/479 |
| 6,404,548 B1 | * | 6/2002 | Tatsuki et al. | 359/449 |
| 6,461,736 B1 | * | 10/2002 | Nagashima et al. | 428/432 |
| 2001/0036545 A1 | * | 11/2001 | Nishi et al. | 428/315.7 |
| 2003/0048396 A1 | * | 3/2003 | Ishii et al. | 349/96 |

* cited by examiner

*Primary Examiner*—Xiao Wu
(74) *Attorney, Agent, or Firm*—Wenderoth, Lind & Ponack, L.L.P.

(57) ABSTRACT

A touch panel has a first transparent substrate with a first transparent conductive layer, and a second transparent substrate with a second transparent conductive layer. Color of the touch panel has a b* value of 2.0 or smaller with respect to the L*a*b* color specification in accordance with JIS Z 8729. At least one of the first and second transparent substrates is provided with a color adjustment layer providing optical interference. The touch panel may further have a third transparent substrate provided with a color adjustment layer, or a third transparent substrate containing a colorant having color complementary to a color of the transparent conductive layer. The touch panel has a less yellowish appearance, and shows minimal color change of a color display device. When attached on a liquid crystal display device in an electronic apparatus, the electronic apparatus exhibits a high grade color display without a sense of incompatibility.

14 Claims, 7 Drawing Sheets

TOUCH PANEL AND ELECTRONIC APPARATUS USING THE SAME

FIELD OF THE INVENTION

The present invention relates to a touch panel which is attached in front of a display surface of a liquid crystal display device or similar display devices. The touch panel makes it possible to input a certain specific signal corresponding to contents displayed on the display device by pressing its surface with a pen or a finger. The present invention also relates to an electronic apparatus using the touch panel.

BACKGROUND OF THE INVENTION

An increasing number of electronic apparatus have been employing a touch panel (hereinafter the touch panel is referred to as TP), which enables the input of a certain specific signal corresponding to displayed contents by pressing the relevant place on the display screen with a pen or a finger. In the following, a conventional TP is described referring to the drawings. The drawings used in the present invention are shown expanded in the direction of panel thickness for the sake of easier understanding.

FIG. 10 is a cross sectional view of a conventional TP. Referring to FIG. 10, a first transparent substrate 1, or bottom substrate, is made of a glass, a plastic film, a plastic sheet or similar material. The first transparent substrate 1 is provided on an upper surface with a first transparent conductive layer 2 formed by sputtering indium tin oxide (ITO) or tin dioxide ($SnO_2$). Provided on the first transparent conductive layer 2 are very small dot spacers 3 made of an insulating epoxy resin or similar material disposed at a certain specific pitch. A second transparent substrate 4, or upper substrate, made of a glass, a plastic film or a plastic sheet, is provided beneath its lower surface with a second transparent conductive layer 5 made of ITO, $SnO_2$, or the like.

The first transparent substrate 1 and the second transparent substrate 4 are adhered together by an outer circumference part 6 so that the second transparent conductive layer 5 is opposed to and insulated from the first transparent conductive layer 2 with a certain specific clearance. An insulation pattern, an electrode pattern, a wiring pattern, a pattern of adhesive compound, or the like are provided in the outer circumference part 6.

The upper surface of the second transparent substrate 4 is covered with a hard coat layer 7 of pencil hardness of 3H, which is made of an acrylic resin in order to protect the upper surface from scratches or other possible damage caused when it is pressed with a pen or a finger.

A flexible circuit board 8 is fixed by an adhesive at one end with the outer circumference part 6 for delivering output signals generated at the first transparent conductive layer 2 and the second transparent conductive layer 5 to an external circuit (not shown), while another end is connected with the external circuit.

Next, operation of the above-configured conventional TP is described.

When a transparent substrate 4 is pressed with a finger or a pen at a specific position from above, the substrate bends at the position and along the surrounding area. This brings the first transparent conductive layer 2 and the second transparent conductive layer 5 into contact at the pressed position. The dot spacers 3 keep the transparent conductive layers separated so as to make no contact with each other in areas other than the pressed position.

The pressed position is detected by an external circuit via the flexible circuit board 8 in the form of a voltage ratio relative to a voltage applied to the transparent conductive layer 2 and the transparent conductive layer 5 at the position of contact.

Since the transparent conductive layers 2 and 5, made of ITO, $SnO_2$ or the like, have a slightly yellowish color, conventional TPs sometimes exhibit a yellowish color, which is one of the problems of the TPs.

Namely, when a conventional TP is attached on a monochrome liquid crystal display device, the display device is seen as slightly yellowish via the TP because the display device originally has a background color of gray-yellow or yellow-green. When a conventional TP is attached on a color display device such as a color liquid crystal display device, a color organic EL or the like, the color tone of the color display device sometimes changes, creating a sense of incompatibility in the display of white, among other colors. This impairs evaluation of the apparatus, and requests for improvement have been increasingly arising.

The yellow color can be numerically represented by the b* value of L*a*b* (hereinafter referred to as b* value) color specification in accordance with JIS (Japan Industrial Standard) Z 8729, which is equivalent with CIE (Commission Internationale de l'Ecrairage) LAB and CIE LUV. The larger the + value in b* value, the stronger the color yellow; whereas the larger the negative value, the stronger the color blue.

The glass with ITO layer normally has a b* value of +1 or greater, and the plastic film or sheet with ITO layer has a b* value of +1.5 or greater. So, a TP formed of a glass transparent substrate 1 and a plastic transparent substrate 4 has a b* value of +2.5 or greater, and a TP in which both of the transparent substrates 1 and 4 are plastic has a b* value of +3 or greater.

The present invention addresses the above problems, and provides a high quality TP which has a reduced yellowish appearance.

SUMMARY OF THE INVENTION

A TP of the present invention comprises a first transparent substrate provided with a first transparent conductive layer and a second transparent substrate provided with a second transparent conductive layer. The second transparent conductive layer opposes the first transparent conductive layer with a certain specific clearance. A b* value of the TP is 2.0 or smaller in the L*a*b* color specification in accordance with JIS Z 8729. At least one of the first transparent substrate and the second transparent substrate is provided with a layer for color adjustment which generates an optical interference. A TP in another embodiment of the present invention further comprises a third transparent substrate provided with a color adjustment layer, or a third transparent substrate containing a colorant that has a color complementary to the color of the transparent conductive layer. A TP in still another embodiment of the present invention contains a colorant that has a color complementary to the color of the transparent conductive layer in at least one of the first and the second transparent substrates.

A TP in the present invention is less yellowish and shows minimal change in display color when attached on a color display device. When attached on a display surface of a liquid crystal display device or the like of an electronic apparatus, the electronic apparatus shows a high quality color display along with a minimal sense of incompatibility.

DESCRIPTION OF THE PREFERRED EMBODIMENTS

In the following, exemplary embodiments of the present invention are described with reference to FIG. 1 through FIG. 9. The drawings are shown enlarged in a direction of a thickness of a panel so that the panel structure can be easily understood.

First Exemplary Embodiment

Figure 1:
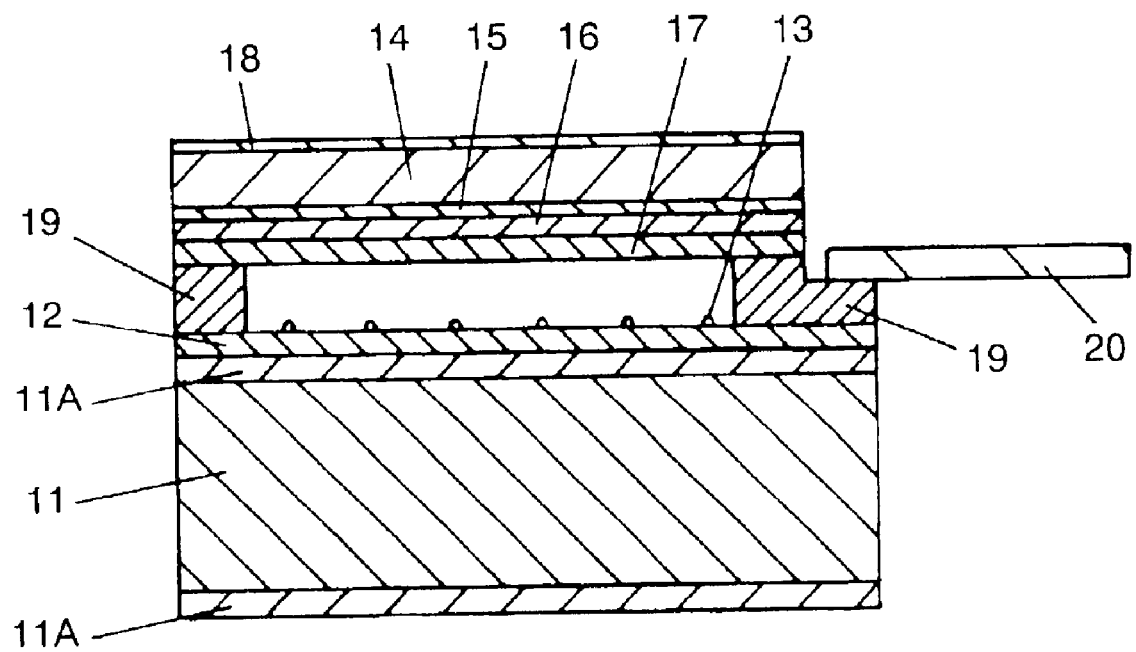
FIG. 1 is a cross sectional view of a TP in accordance with a first exemplary embodiment of the present invention.

FIG. 1 shows a cross sectional view of a TP in accordance with a first exemplary embodiment of the present invention. A first transparent substrate 11, or a lower substrate, is made of 1.1 mm thick soda lime glass.

The first transparent substrate 11 is provided at both of an upper and a lower surfaces with silicon dioxide ($SiO_2$) layers 11A for preventing alkaline substance from dissolving out of the glass material. On the upper $SiO_2$ layer 11A, a first transparent conductive layer 12 of ITO having a refractive index of 1.9 is formed at a thickness of 200 Å.

The light transmittance of the transparent substrate 11 including the upper and the lower $SiO_2$ layers 11A and the transparent conductive layer 12 is measured using a visible light spectrophotometer. The transmitted light does not have a peak spectrum at a specific wavelength; the total luminous transmittance in accordance with JIS K 7361-1 (hereinafter referred to as total transmittance) is 94%, and b* value specified by the L*a*b* color specification in accordance with JIS Z 8729 (hereinafter referred to as b* value) is 1.0.

Very small sized dot spacers 13 made of an insulating epoxy resin or similar material are disposed on the transparent conductive layer 12 at a specific pitch.

Beneath a lower surface of a second transparent substrate 14, which is an upper substrate made of a 175 μm thick biaxially oriented polyethylene terephthalate (PET) film, a titanium dioxide ($TiO_2$) layer 15 having a refractive index of 2.2 is formed. Further beneath a surface of the $TiO_2$ layer 15, a $SiO_2$ layer 16 having a refractive index of 1.4 is formed.

In the present embodiment, the $TiO_2$ layer 15 and the $SiO_2$ layer 16 are controlled to have certain respective layer thicknesses to function integrally as a color adjustment layer. Namely, the $TiO_2$ layer 15 is formed at a thickness of 500 Å and the $SiO_2$ layer 16 at a thickness of 400 Å in the present exemplary embodiment.

Beneath the lower surface of the $SiO_2$ layer 16, a second transparent conductive layer 17 of ITO, having a refractive index of 1.9, is formed at a thickness of 200 Å.

On an upper surface of the transparent substrate 14, a transparent hard coat layer 18 of an acrylic resin having a pencil hardness 3H is provided to protect the surface from being damaged by a finger or a pen used during input operation.

Spectral transmittance of the transparent substrate 14, the color adjustment layer consisting of the $TiO_2$ layer 15 and the $SiO_2$ layer 16, and the second transparent conductive layer 17 has a peak value of 94% at 480 nm, the total transmittance is 91%, and the b* value is -0.2.

Figure 2:
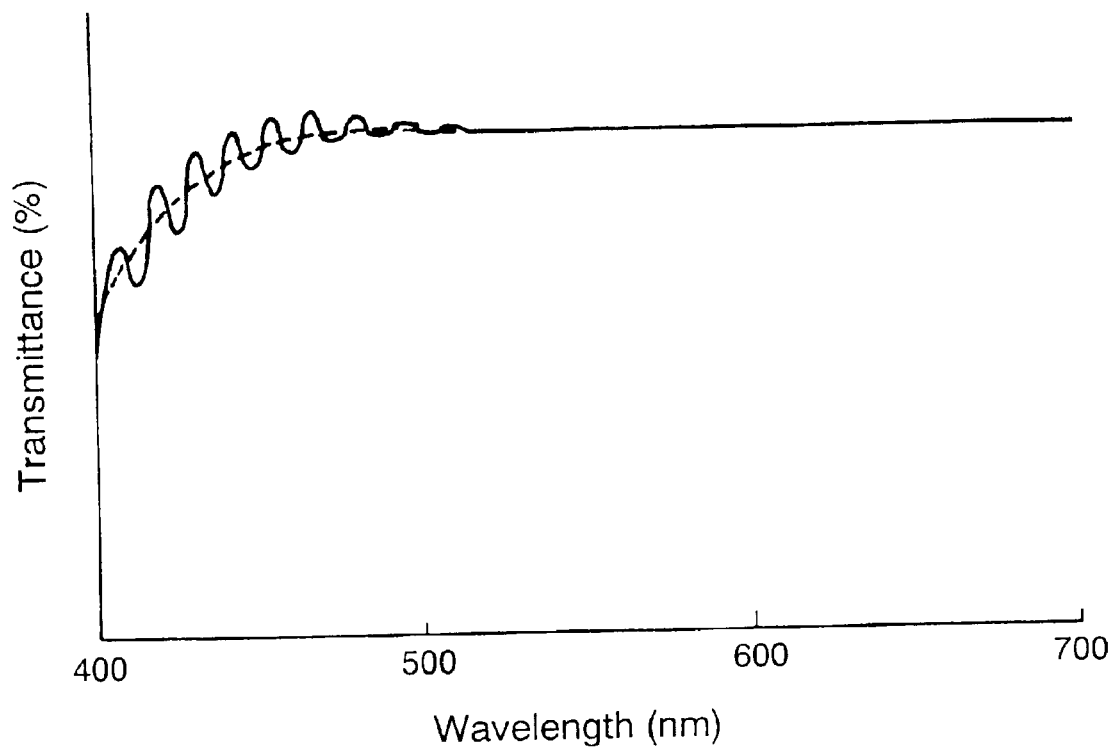
FIG. 2 is a chart showing light transmittance of the TP.
Figure 3:
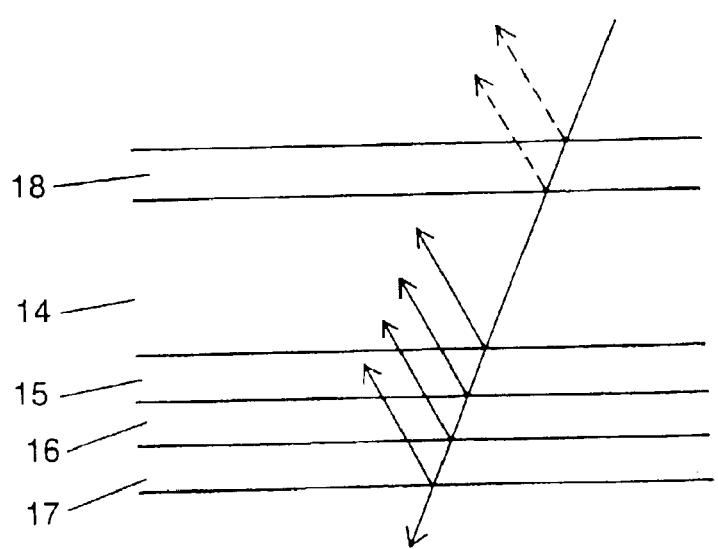
FIG. 3 shows a state of light transmission to the second transparent substrate.

Spectral transmittance of the transparent substrate 14 was also measured by the visible light spectrophotometer in the same way as the transparent substrate 11. In some cases, the spectral peak of the transmittance changes at a short cycle of approximately 10 nm for a small amplitude of approximately 1–2% transmittance, as shown in FIG. 2 with a solid line, as a result of optical interference of the hard coat layer 18 or the like. When such a spectral transmittance curve appears, the short-cycle small-amplitude portion is averaged to provide a spectral transmittance curve as indicated with a dotted line in FIG. 2, and the peak of the latter curve is regarded as the spectral peak of the transmittance.

The transparent substrates 11 and 14 are adhered together at an outer circumferential part 19 so that the transparent conductive layer 12 and the transparent conductive layer 17 are opposed to and insulated from each other by a gap of approximately 100 μm.

In the outer circumferential part 19, an insulating epoxy resin pattern, an electrode pattern and a wiring pattern formed of powdered Ag and a polyester resin, an adhesive pattern of an acrylic pressure sensitive adhesive and the like are formed.

A flexible circuit board 20 is adhered and fixed at its one end with the outer circumferential part 19 for delivering the signals from the transparent conductive layers 12 and 17 to an external circuit, while another end of the flexible circuit board is connected with an external circuit (not shown).

The operating principle of the above-configured TP remains the same as that described in the background of the invention. Namely, when the transparent substrate 14 is pressed at a certain specific position with a finger or a pen from above, it bends at the position, together with the surrounding area, which causes the transparent conductive layer 17 to make contact with the transparent conductive layer 12 at a place, corresponding to the position. A voltage ratio at the position is detected by an external circuit via the flexible circuit board 20.

Next, a method of manufacturing the TP in the present embodiment is described.

A transparent substrate 11 is dipped into a silicone alkoxide solution, and then baked at 400° C. to have $SiO_2$ layers 11A formed on upper and lower surfaces thereof On an upper surface of the $SiO_2$ layer 11A, a transparent conductive layer 12 is formed by a sputtering method, and then dot spacers 13 are formed thereon by screen printing or similar process.

A transparent substrate 14 is provided on one of its surfaces with a transparent hard coat layer 18 by a roll coating process, and then on another surface with a $TiO_2$ layer 15, an $SiO_2$ layer 16 and a transparent conductive layer 17 in this order by a sputtering method.

An insulation pattern, an electrode pattern, a wiring pattern, a pattern of pressure sensitive adhesive, which integrally constitute an outer circumferential part 19, are formed on either one or both of the transparent substrate 11 and the transparent substrate 14 by a screen printing method or similar process. The transparent substrate 14 and the transparent substrate 11 are adhered together via the outer circumferential part 19 so that the transparent conductive layer 17 opposes the transparent conductive layer 12 with a specific distance in between.

The adhered body is then kept in a hot chamber of approximately 50–120° C. in order to slightly soften the outer circumferential part 19. By such treatment, the transparent substrate 14, which is adhered only in the area of outer circumferential part 19, is released from strain and surface flatness of the transparent substrate 14 is assured.

Finally, a flexible circuit board 20 is connected to a specific position by hot pressing to provide a finished TP.

A TP thus completed shows a total transmittance of 86% and has a b* value of +0.8. Thus it has a color of reduced yellowish color with very high total transmittance.

The above results are obtained by an effect of the b* value of the transparent substrate 14.

When light passes through the transparent substrate 14 provided with the above-described layers, each of the interfaces, formed by materials of different refractive indices, reflects the light. Meanwhile, the transparent substrate 14 is provided with a $TiO_2$ layer 15 and an $SiO_2$ layer 16, formed at a specific thickness between the transparent substrate 14 and the transparent conductive layer 17, which work as a color adjustment layer that allows the short-wavelength light to pass through at a high luminous transmittance. As a result, the luminous transmittance of the transparent substrate 14 is controlled to have a peak value of 93% of spectral transmittance at 480 nm, as shown with the dashed-dotted line in FIG. 4. Due to this effect, a decrease of luminous transmittance, at a short-wavelength light of 400–500 nm, caused by the transparent conductive layer 17, can be improved.

The spectral transmittance and the peak position are adjustable by controlling the layer thickness of the $TiO_2$ layer 15 and the $SiO_2$ layer 16. For example, it is possible to allow the 400–500 nm wavelength component to pass through the layers without having a peak in the spectral transmittance, as shown with the dotted line in FIG. 4.

Since the TP in the present embodiment employs the second transparent substrate 14 having the spectral peak at 480 nm, the TP as a whole allows the light containing a 400–500 nm short-wavelength component, for example, to pass through at a high transmittance. The yellowish appearance of a TP can thereby be improved, and a high transmittance can be obtained.

Figure 4:
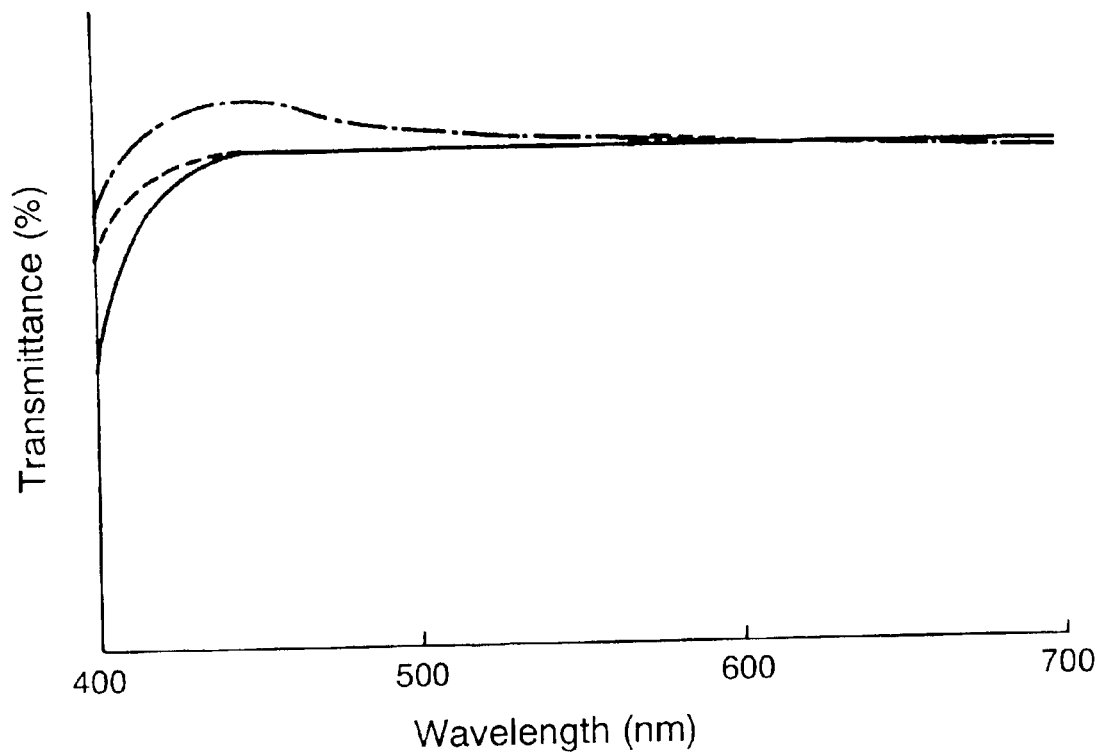
FIG. 4 is a chart showing light transmittance of the TP in the first embodiment of the present invention.

Namely, a TP that exhibits an effectively reduced yellowish appearance can be produced by employing a substrate having the spectral transmittance peak at 500 nm or shorter. In FIG. 4, the solid line curve represents a conventional TP.

The TP in the present embodiment has a b* value of +0.8, which represents a sum of the transparent substrate 11 and the transparent substrate 14. When the TP is attached on a display device (not shown) of an apparatus, it effects a minimal color change and there is almost no sense of incompatibility, regardless of whether the display device is a monochromatic display device or a color display device. Furthermore, the display can be more clearly seen.

According to the results of experiments conducted by the inventors of the present invention, any TP having a b* value of 2.0 or smaller exhibits, like the one described in the above, the least significant color change when it is attached on a display device. However, it is preferred that the b* value is within a range of not greater than +1.0 and not smaller than –2.0.

In a case where the transparent substrate 11 is made of glass, the practical thickness is 0.2–5 mm, preferably 0.4–3 mm.

Besides the glass material, the transparent substrate 11 may be made of a transparent plastic sheet of an acrylic resin, a methacrylic resin, a polyolefin resin, a polycyclohexadiene resin, or similar material formed through an ordinary method such as extruding, press molding, a casting process or an injection molding. A transparent film such as a biaxially oriented PET film, a polycarbonate film, a polyether sulfon film, a polyallylate film, or a polyolefin film may also be used. The practical thickness of them is, for example, 0.025–0.5 mm, preferably 0.075–0.25 mm.

Plastic film or sheet used for the transparent substrate 11 tends to increase the b* value of transparent substrate 11, as compared to a glass substrate. Therefore, it is preferred to also provide a color adjustment layer on the transparent substrate 11 side, like the structure of the transparent substrate 14.

The transparent substrate 14 may be made of, besides the biaxially oriented PET film, a biaxially oriented polyethylene naphthalate film, a mono-axially oriented polyethylene terephthalate film, a polycarbonate film, a polyether sulfon film, a polyallylate film, a polyolefin film, or the like. The practical thickness is 0.05–0.4 mm, preferably 0.1–0.2 mm.

Besides the ITO, the transparent conductive layer 12 and the transparent conductive layer 17 may be made of tin dioxide ($SnO_2$), zinc oxide (ZnO), gold (Au) thin film, silver (Ag) thin film or the like.

In place of the $TiO_2$ layer 15 and the $SiO_2$ layer 16 provided as the color adjustment layer, the following layers may be used. In place of the high refractive index $TiO_2$ layer 15, a layer having a refractive index of 1.7 or higher, such as an ITO layer, an $SnO_2$ layer, or a zirconium dioxide ($ZrO_2$) layer, may be used. In place of the low refractive index $SiO_2$ layer 16, a layer having a refractive index of 1.5 or lower, such as a magnesium fluoride ($MgF_2$) layer or the like, may be used. Optimum layer thickness must be decided according to the respective materials.

It is not necessary for a color adjustment layer to be formed of the above-described two layers, i.e. a layer of high refractive index and a layer of low refractive index. It may be a single layer, or three or more layers. In any case, the thickness of the layers needs to be controlled so that the spectral peak of transmittance is at 500 nm or shorter wavelength.

When the color adjustment layer is formed of a single layer, it is effective to make the color adjustment layer using a material of low refractive index, and to provide the layer of low refractive index directly under a transparent conductive layer, because the ITO layer has a high refractive index.

In a case of a multi-layer color adjustment layer, where a high refractive index layer and a low refractive index layer are alternately disposed, the low refractive index layer may be preferably disposed directly under the transparent conductive layer.

The place for disposing the above color adjustment layers is not limited to the place between the transparent conductive layer 17 and the transparent substrate 14. The same effects can be obtained by disposing the layer at least at one of the places of, for example, at the lower surface of the transparent substrate 11, between the transparent conductive layer 12 and the transparent substrate 11, and on the upper surface of the transparent substrate 14. Besides the above-described disposition, the color adjustment layer may be provided on each of the opposing substrates, or provided at a plurality of places. A TP having such configuration exhibits a further reduced yellowish appearance with a high transmittance.

Second Embodiment

Figure 5:
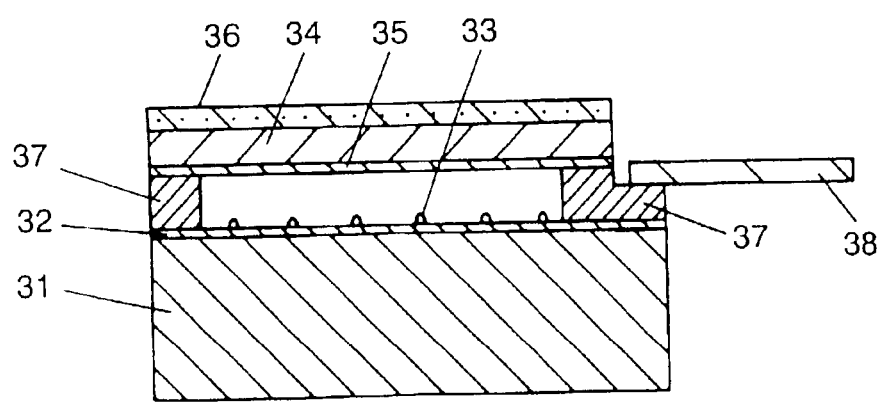
FIG. 5 is a cross sectional view of a TP in accordance with a second exemplary embodiment of the present invention.

FIG. 5 is a cross sectional view of a TP in accordance with a second exemplary embodiment of the present invention. Referring to FIG. 5, a first transparent conductive layer 32 made of an ITO and having a refractive index of 1.9 is formed on an upper surface a first transparent substrate 31 made of 1.1 mm thick soda lime glass.

Spectral transmittance through the transparent substrate 31 including the first transparent conductive layer 32 formed thereon, does not show a peak, total transmittance is 90%, and the b* value is 2.0.

The transparent substrate 31 in the present embodiment is also provided with $SiO_2$ layers for preventing alkaline substance from dissolving out of the glass. Illustration and description of the $SiO_2$ layers are omitted here.

Very small sized dot spacers 33 made of an insulating epoxy resin or similar material are provided on a surface of the transparent conductive layer 32 and are disposed at a specific pitch.

A second transparent substrate 34 made of a 175 μm thick biaxially oriented PET film is provided at a lower surface with a second transparent conductive layer 35 of ITO and having a refractive index of 1.9.

On the upper surface of the transparent substrate 34, a transparent hard coat layer 36 of pencil hardness 3H and made of an acrylic resin is provided in order to protect the transparent substrate 34 from being damaged by a finger or a pen used for an inputting operation. The transparent hard coat layer 36 in the present embodiment contains a 0.1 weight % of blue pigment, phthalocyanine blue, whose color is complementary to the first and the second transparent conductive layers 32 and 35.

Although the phthalocyanine blue is actually in a state of fine particles of 1 μm or smaller in diameter, it is represented by black dots in the hard coat layer 36 in FIG. 5.

Spectral transmittance through the transparent substrate 34, the transparent conductive layer 35 formed thereon and the hard coat layer 36 shows a peak value of 88% at 460 nm, the total transmittance is 86%, and the b* value is −3.0.

The distance between the transparent substrate 31 and the transparent substrate 34, the structure of outer circumferential part 37 and other structures of a TP in the present embodiment remain the same as those of the first embodiment.

The above-configured TP in the present embodiment shows a 77% total transmittance and a b* value of −1.0, rendering a color of minimal yellowish color, or colorless, or a color slightly close to blue. This result has been brought about by the use of the hard coat layer 36, which was adjusted to have a b* value of −3.0 by mixing in the blue pigment.

Since the TP in the present embodiment comprises a transparent substrate 34 having a smaller number of layers as compared with the first embodiment, the TP can be produced at a relatively low cost.

Any TP having a b* value of 2.0 or smaller shows, as in the present embodiment, a minimally significant color change when it is attached on a display device. However, it is preferred that the b* value is within a range not greater than +1.0 and not smaller than −2.0.

In place of the phthalocyanine blue pigment mixed in the hard coat layer 36, other blue pigments or dyes may be used. Preferred content is 0.01–0.5 weight % in a resin component of the hard coat layer 36. Too great an amount of pigment or dye may result in too thick a coloring. This not only invites an overwhelming complementary color but it causes a deteriorated luminous transmittance. So, the amount of pigment or dye needs to be decided on request.

As described above, it is an efficient procedure to mix a blue pigment into the hard coat layer 36 to obtain a required color with a smaller number of layer forming steps. However, it is also possible to modify the b* value by providing another color adjustment layer different from the hard coat layer.

The color adjustment layer may be provided at at least one of the following places: the lower surface of the first transparent substrate 31, between the first transparent conductive layer 32 and the first transparent substrate 31, between the second transparent conductive layer 35 and the second transparent substrate 34, and the upper surface of second transparent substrate 34. The color adjustment layer (s) may be disposed taking into consideration the colors and the deterioration in the luminous transmittance of the TP.

In an exemplary case where each of the opposing substrates is provided with a layer containing a colorant, i.e. in a TP where there are two colorant-containing layers, a sum of the b* values makes the b* value of an entire TP. Therefore, it may be a practical idea to determine a b* value for each of the colorant-containing layers to be a half of the desired b* value of the entire TP.

The above description is made on a procedure in which the colorant-containing layers are provided separately. However, the same effects can be obtained by mixing a colorant into the first or the second transparent substrate, the color of the colorant being complementary to color of the first and the second transparent conductive layers. A colored sheet glass, a colored resin sheet or the like may be used for the purpose.

Third Embodiment

Figure 6:
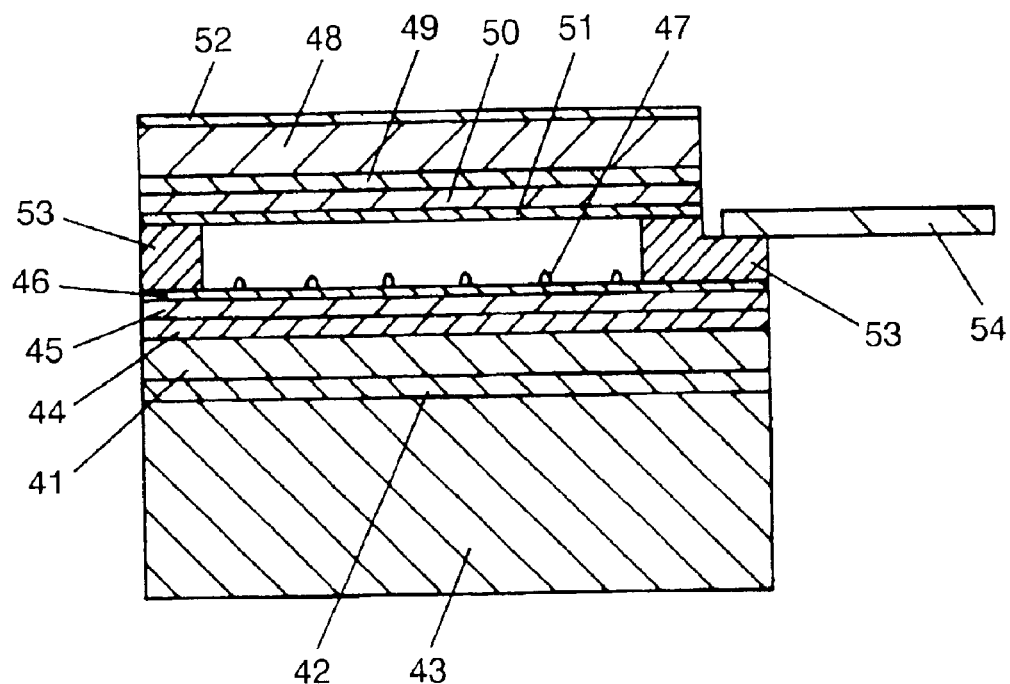
FIG. 6 is a cross sectional view of a TP in accordance with a third exemplary embodiment of the present invention.

FIG. 6 is a cross sectional view of a TP in accordance with a third exemplary embodiment of the present invention. Referring to FIG. 6, a first transparent substrate 41 of a biaxially oriented PET film is supported at the lower surface, via an adhesive layer 42 made of an acrylic resin, by a transparent supporting substrate 43 of a 1.0 mm thick polycarbonate sheet.

An ITO layer 44 of refractive index of 1.9, and an $SiO_2$ layer 45 of a refractive index of 1.4, are formed on an upper surface of the transparent substrate 41. The ITO layer 44 and the $SiO_2$ layer 45 are formed at a predetermined thickness to function as a color adjustment layer.

A first transparent conductive layer 46 of an ITO having a refractive index of 1.9 is provided on an upper surface of the $SiO_2$ layer 45.

Spectral transmittance through the transparent substrate 41, the color adjustment layer consisting of the ITO layer 44 and the $SiO_2$ layer 45, the transparent conductive layer 46, the transparent supporting substrate 43 and the adhesive layer 42 shows a peak value of 92% at 490 nm, a total transmittance is 91%, and the b* value is +0.1.

Very small sized dot spacers 47 made of an insulating epoxy resin or similar material are disposed on the transparent conductive layer 46 at a certain specific pitch.

Beneath a lower surface of the second transparent substrate 48, which is made of a 175 μm thick biaxially oriented PET film, a $TiO_2$ layer 49 having a refractive index of 2.2 is provided, and an $SiO_2$ layer 50 having a refractive index of 1.4 is formed beneath a lower surface of the $TiO_2$ layer 49.

The thickness of the $TiO_2$ layer 49 and the $SiO_2$ layer 50 are controlled to a predetermined thickness so that the layers function as a color adjustment layer. A second transparent conductive layer 51 of an ITO and having a refractive index of 1.9 is formed beneath the lower surface of the $SiO_2$ layer 50.

Spectral transmittance through the transparent substrate 48, the color adjustment layer consisting of the $TiO_2$ layer 49 and SiO$_2$ layer 50, and the transparent conductive layer 51 has a peak value of 93% at 480 nm, a total transmittance is 91%, and the b* value is −0.2.

On an upper surface of the transparent substrate 48, a hard coat layer 52 of pencil hardness of 3H and made of an acrylic resin is provided in order to protect the second transparent substrate 48 from being damaged by a finger or a pen used for an inputting operation.

The transparent substrate 41, the second transparent substrate 48, the distance between the transparent conductive layer 46 and the transparent conductive layer 51, the structures of an outer circumferential part 53 and other portions of the TP in the present embodiment remain the same as those in the first and the second embodiments. The above-configured TP in the present embodiment rendered a b* value −0.1, having minimal yellowish color, or a color close to colorless transparency. Furthermore, it provides a total transmittance as high as 83%.

These characteristics are brought about by the color adjustment layer. The effectiveness and advantages remain the same as those in the first embodiment, and detailed description is omitted here. Since the TP in the present embodiment is provided with color adjustment layers on both of the transparent substrate 41 and the transparent substrate 48, significant improvements are observed in the b* value and the total transmittance.

Furthermore, since the transparent substrate 41 is supported by the transparent supporting substrate 43, the rigidity and the durability are improved. Careless bending of the first and the second transparent substrates 41 and 48 can be avoided, and stable contact during operation is obtained.

A TP that has an effectively reduced yellowish appearance can be produced by employing a substrate having the spectral peak at 500 nm or shorter. Any TP having a b* value of 2.0 or smaller exhibits a minimal amount of significant color change when it is attached on a display device. However, it is preferred that the b* value is within a range of not greater than +1.0 and not smaller than −2.0, as disclosed in the first embodiment.

Besides the polycarbonate sheet described earlier, the transparent supporting substrate 43 may be made of a plastic sheet of an acrylic resin, methacrylic resin, polyolefin resin, polycyclohexadiene resin, norboruene resin, or the like, which are formed through an ordinary process such as extruding, press molding, a casting process or injection molding, or of a glass material. The practical thickness of the transparent supporting substrate 43 is 0.2–5 mm, preferably 0.4–3 mm.

As for the acrylic resin adhesive layer 42, those having a good adhesive property with both of the transparent substrate 41 and the transparent supporting substrate 43 are preferred. Besides the acrylic resins, silicone resin pressure sensitive adhesive may also be used. The adhesive layer 42 may be applied on the first transparent substrate 41 or the transparent supporting substrate 43, or it may be used in the form of a double-sided pressure sensitive adhesive tape.

Fourth Embodiment

Figure 7:
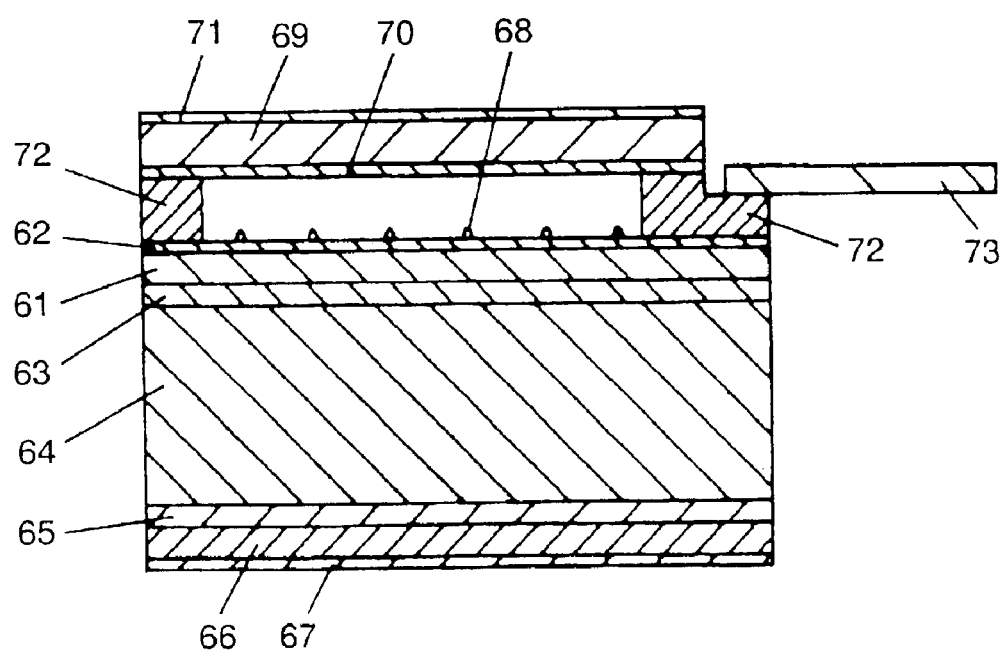
FIG. 7 is a cross sectional view of a TP in accordance with a fourth exemplary embodiment of the present invention.

FIG. 7 is a cross sectional view of a TP in accordance with a fourth exemplary embodiment of the present invention. Referring to FIG. 7, a first transparent conductive layer 62 of ITO and having a refractive index of 1.9 is formed on an upper surface of a first transparent substrate 61 of biaxially oriented PET film. The first transparent substrate 61 is supported, via an adhesive layer 63 of an acrylic resin formed beneath the lower surface, by a transparent supporting substrate 64 which is made of a 1.0 mm thick polycarbonate sheet.

Beneath the lower surface of the transparent supporting substrate 64 in the present embodiment, a SiO$_2$ layer 65 with a refractive index of 1.4, an ITO layer 66 with a refractive index of 1.9 and a SiO$_2$ layer 67 with a refractive index of 1.4 are formed in this order. Each of these layers is controlled to a predetermined thickness to constitute a color adjustment layer.

Spectral transmittance through the transparent substrate 61, the transparent conductive layer 62, the transparent supporting substrate 64, the color adjustment layer and the adhesive layer 63 has a peak value of 94% at 480 nm, and the total transmittance is 92%, and the b* value is −2.4.

Very small sized dot spacers 68 made of an insulating epoxy resin or similar material are disposed on the first transparent conductive layer 62 at a certain specific pitch.

A second transparent conductive layer 70 made of an ITO and having a refractive index of 1.9 is formed beneath a lower surface of a 175 μm thick biaxially oriented PET film, and a hard coat layer 71 of pencil hardness 3H made of an acrylic resin is formed on an upper surface of the second transparent substrate 69. Spectral transmittance through the transparent substrate 69, the hard coat layer 71, and the transparent conductive layer 70 formed on both surfaces does not have a spectral peak, and the total transmittance is 88%, and the b* value is 3.0.

The transparent substrate 61, the second transparent substrate 69, the distance between the transparent conductive layers 62 and 70, the structures of outer circumferential part 72 and other portions of the TP in the present embodiment remain the same as those in the foregoing embodiments.

The above-configured TP in the present embodiment show a total transmittance of 81% and a b* value of +0.6. It renders a color that is minimally yellowish, or close to colorless transparency. This is due to the function of the color adjustment layer, as described in the first embodiment.

The color adjustment layer in the present embodiment is disposed at the lower surface of the transparent supporting substrate 64, or the place least affected by an operating force given on a TP. Thus the color adjustment layer can be kept away from unexpected bending and other mechanical influences when the TP is operated. The TP maintains a good appearance of minimum yellowish color and high transmittance for a long period of time.

As described above, the color adjustment layer is formed on the transparent supporting substrate 64, and can be formed independently from the first and the second transparent substrates 61, 69 having the first and the second transparent conductive layers 62, 70. This makes it easy to adjust and control the respective layers in their thickness. This means that the color adjustment layer and the first and the second transparent conductive layers 62, 70 are easily available at their optimum layer thickness and with optimum characteristics.

In the present embodiment, each of the respective substrates is provided only at one of the surfaces with one layer of the color adjustment layer, the first and the second transparent conductive layers 62, 70. The layers can then be formed by a simple process, and high quality layers can be provided at a low cost. Consequently, an integrated TP has a high grade appearance of minimal yellowish color at relatively low cost.

Also, in the construction of the present embodiment, a TP that renders an effectively reduced yellowish appearance can be manufactured by employing a substrate having a peak spectral transmittance at 500 nm or shorter wavelength. Further, any TP having a b* value of 2.0 or smaller gives a minimal amount of significant color change when it is attached on a display device. However, it is also preferred that the b* value is within a range of not greater than +1.0 and not smaller than −2.0 in the present embodiment, as with the first embodiment.

Besides the above-described structure, a TP may be formed by adhering a transparent substrate having a color adjustment layer to the lower surface of the transparent supporting substrate 64. Or a transparent substrate having a color adjustment layer may be adhered to a lower surface of the first transparent substrate or to the upper surface of the second transparent substrate.

Fifth Embodiment 5

Figure 8:
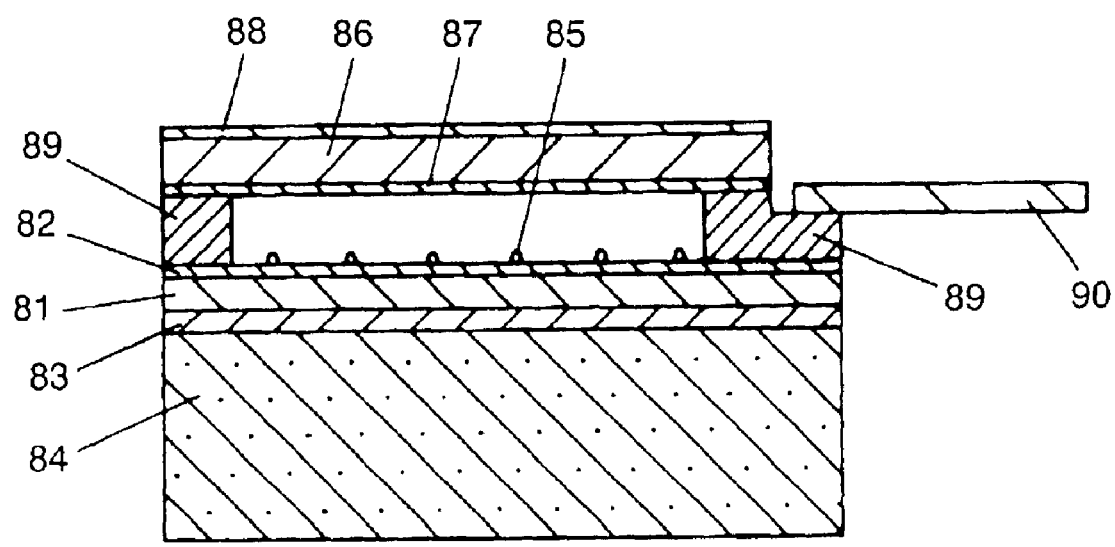
FIG. 8 is a cross sectional view of a TP in accordance with a fifth exemplary embodiment of the present invention.

FIG. 8 is a cross sectional view of a TP in accordance with a fifth exemplary embodiment of the present invention. Referring to FIG. 8, a first transparent substrate 81 of biaxially oriented PET film is provided at the upper surface with a first transparent conductive layer 82 with a refractive index of 1.9 and made of an ITO. The first transparent substrate 81 is supported, via an adhesive layer 83 of an acrylic resin formed beneath the lower surface thereof, by a transparent supporting substrate 84 of a 1.0 mm thick polycarbonate sheet.

The transparent supporting substrate 84 in the present embodiment contains within the polycarbonate sheet a colorant of 0.1 weight % of phthalocyanine blue, whose color is complementary to the transparent conductive layer 82 and a second transparent conductive layer 87, which are to be described later.

Spectral transmittance through the transparent substrate 81, the transparent conductive layer 82, the transparent supporting substrate 84, and the adhesive layer 83 has a peak value of 85% at 480 nm, the total transmittance is 83%, and the b* value is −2.0.

Very small sized dot spacers 85 made of an insulating epoxy resin or similar material are disposed on the first transparent conductive layer 82 at a specific pitch.

A second transparent conductive layer 87 having a refractive index of 1.9 and made of an ITO are formed beneath a lower surface of a second transparent substrate 86 of a 175 μm thick biaxially oriented PET. On the upper surface of the second transparent substrate 86, a hard coat layer 88 of pencil hardness 3H and made of an acrylic resin is formed.

Spectral light transmittance through the transparent substrate 86, the transparent conductive layer 87 and the hard coat layer 88 does not have a peak, total transmittance is 88%, and the b* value is 3.0.

The transparent substrate 81, the transparent substrate 84, a distance between the transparent conductive layer 82 and the transparent conductive layer 87, the structures of outer circumferential part 89 and other portions of the TP in the present embodiment remain the same as those in the fourth embodiment.

The TP having the above-described structure shows a total transmittance of 75% and a b* value of +0.1, giving a minimally yellowish color, or a color close to colorless transparency.

This is due to the function of the colorant contained in the transparent supporting substrate 84. The working principle remains the same as that in the second embodiment, and further description is eliminated here. In the present embodiment, also, any TP having a b* value of 2.0 or smaller shows a minimal amount of significant color change when it is attached on a display device. However, it is preferred that the b* value is within a range of not greater than +1.0 and not smaller than −2.0.

As in the fourth embodiment, the transparent supporting substrate 84 containing a colorant is a separate member independent from the first and the second transparent substrates 81, 86 having the first and the second transparent conductive layers 82, 87. As a result, it is easy to provide the above-described layers and substrates in their optimized state.

Instead of adding a colorant into the transparent supporting substrate 84, a separate transparent substrate containing a corresponding colorant may be adhered thereto. In this case, the separate transparent substrate containing the colorant can be used for adjusting the color of the transparent supporting substrate 84 containing a colorant.

The separate transparent substrate containing a corresponding colorant may be disposed at a place between the transparent substrate 81 and the transparent supporting substrate 84, or on the upper surface of the transparent substrate 86.

In still another alternative, the transparent substrates provided with a layer containing corresponding colorant may be adhered, or the above-described layer may be formed on the transparent supporting substrate 84, as in the second embodiment.

Sixth Embodiment

Figure 9:
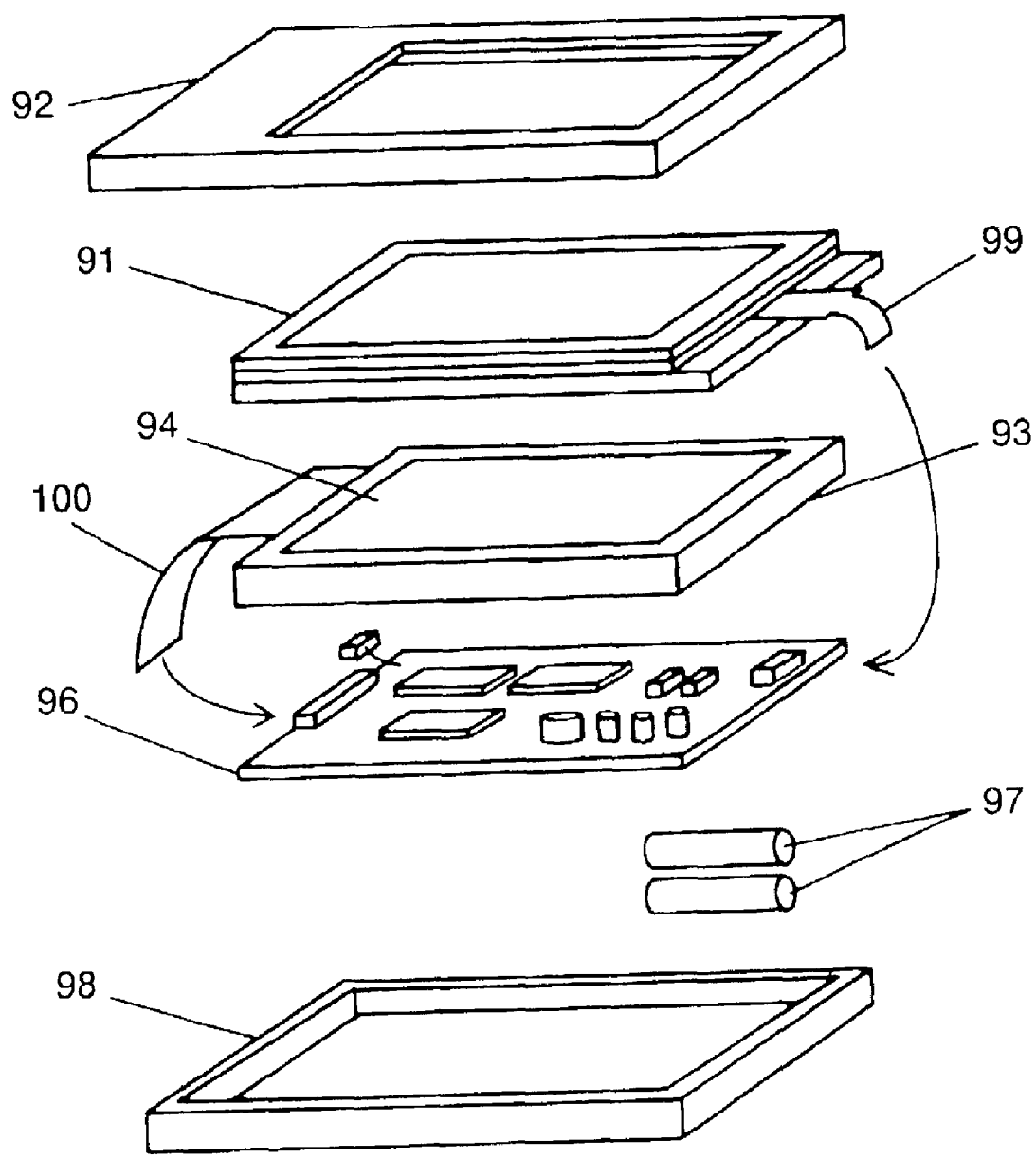
FIG. 9 is an exploded perspective view of an electronic apparatus in accordance with a sixth exemplary embodiment of the present invention.
Figure 10:
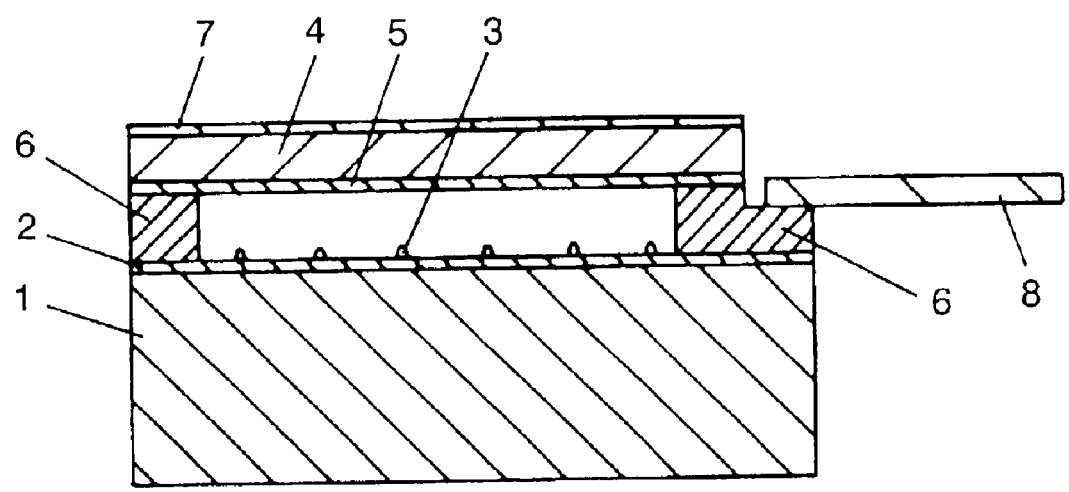
FIG. 10 is a cross sectional view of a conventional TP.

FIG. 9 is an exploded perspective view of a portable information terminal (a handheld computer, hereinafter referred to as PDA), which is an example of an electronic apparatus in accordance with a sixth exemplary embodiment of the present invention. In FIG. 9, TP 91 in accordance with the first embodiment is disposed beneath an upper case 92, and a TFT color liquid crystal display device 93 is disposed underneath the TP 91.

Although the liquid crystal display device 93 is provided on both surfaces with polarization plates 94, the plate 94 beneath a lower surface of the device 93 is not shown in FIG. 9.

A PDA in the present embodiment further comprises a control circuit 96 placed under the liquid crystal display device 93, comprising a central processing unit, a memory device and similar electronic components, and a battery 97 for supplying power to the control circuit 96. These components are packed and supported at their specified places by the upper case 92 and a lower case 98. The TP 91 and the liquid crystal display device 93 are connected with the control circuit 96 via flexible circuit boards 99, 100, each extending out from respective sides.

In the present embodiment those polarization plates 94, a sum of the b* values of which becomes 1.6, are used on both surfaces of the liquid crystal display device 93.

In the above-configured PDA, when the TP 91 is pressed with a pen or a finger, the control circuit 96 performs power ON/OFF, selects software and puts the selected software into operation. The control circuit 96 contains a central processing unit and memory devices for the operation of the handheld computer. The liquid crystal display device 93 shows a display on the screen corresponding to the operating actions as described above.

The handheld computer in the present embodiment has the above-described structure. It judges, at the control circuit 96, specific signals generated as a result of the operation given on the TP 91 for putting a certain specific function into operation.

In the present electronic apparatus, the TP 91 in accordance with the first embodiment has a b* value of 0.8 as described above. When the TP 91 is attached on the liquid crystal display device 93 having polarization plates 94, the total b* value can be made to be 2.4. In this way, an electronic apparatus having a high grade appearance and a superior visibility with the liquid crystal display device, with a minimal yellowish appearance, is obtained.

For the purpose of comparing the visibility of liquid crystal display devices, a sample of a handheld computer was produced by using a TP having a b* value of 3.0 and the polarization plates having a b* value of 1.6 (the total of the b* values being 4.6). Results of the comparison showed that the TFT color liquid crystal display 93 in the present embodiment was superior in that it is easy to watch and the color is natural.

As a result of a precise study by the present inventors, it has been found that an easy-to-see handheld computer that exhibits a natural color comparable to the present embodiment can be obtained when a combined total b* value of a TP and polarization plates of a liquid crystal display device is 3.0 or smaller.

As to the liquid crystal display device 93, the above-described advantages are made available regardless of whether it is a color STN, a monochrome STN or a TN type liquid crystal display. For the polarization plates 94 of the liquid crystal display device, either an iodine polarization plate or a dye polarization plate can be used.

As described in the foregoing, since a TP in the present invention is specified to have a b* value of 2.0 or smaller in the L*a*b* color specification in accordance with JIS Z 8729, an electronic apparatus has a high grade display where the yellowish color of TP is reduced, the color change is small and the sense of incompatibility is decreased.

Although the above descriptions have been made based on a TP in which at least one of the transparent substrates is made of resin sheet or film, the principle of present invention can be applied also to a TP in which both of the transparent substrates are made of glass.

What is claimed is:

1. A touch panel comprising:
    a first transparent substrate provided with a first transparent conductive layer; and
    a second transparent substrate provided with a second transparent conductive layer, said second transparent conductive layer opposing said first transparent conductive layer with a separation distance there between;
    wherein a color of said touch panel has a "b* value" of 2.0 or smaller as specified by the L*a*b* color specification in accordance with JIS Z 8729.

2. The touch panel of claim 1, wherein at least one of said first transparent substrate and said second transparent substrate is provided with an optical interference layer for color adjustment.

3. The touch panel of claim 2, wherein said optical interference layer controls a maximum peak spectrum of spectral transmittance of visible light to be 500 nm or shorter wavelength.

4. The touch panel of claim 1, wherein at least one of said first transparent substrate and said second transparent substrate is provided with a color adjustment layer containing a colorant which is complementary to a color of said first and second transparent conductive layers.

5. The touch panel of claim 1, wherein at least one of said first and second transparent substrates contains a colorant which is complementary to a color of said first and second transparent conductive layers.

6. The touch panel of claim 1, further comprising a third transparent substrate provided with a color adjustment layer providing optical interference.

7. The touch panel of claim 6, wherein said third transparent substrate is disposed at least one of beneath a lower surface of said first transparent substrate, between said first transparent conductive layer and said first transparent substrate, between said second transparent conductive layer and said second transparent substrate, and on an upper surface of said second transparent substrate.

8. The touch panel of claim 6, wherein said color adjustment layer controls a peak spectrum of spectral transmittance of visible light to be 500 nm or shorter wavelength.

9. The touch panel of claim 1, further comprising a third transparent substrate containing a colorant which is complementary to a color of said first and second transparent conductive layers.

10. The touch panel of claim 9, wherein said third transparent substrate is disposed at least one of beneath a lower surface of said first transparent substrate, between said first transparent conductive layer and said first transparent substrate, between said second transparent conductive layer and said second transparent substrate, and on an upper surface of said second transparent substrate.

11. The touch panel of claim 1, wherein at least one of said first transparent substrate and said second transparent substrate comprises a resin film or a resin sheet.

12. The touch panel of claim 2, wherein said optical interference layer is formed on at least one surface of said first transparent substrate and said second transparent substrate.

13. The touch panel of claim 12, wherein said optical interference layer controls one of a maximum peak position and a highest value position of a spectral transmittance of visible light to be 500 nm or shorter wavelength.

14. An electronic apparatus comprising:
    a liquid crystal display device; and
    a touch panel disposed in front of a display surface of said liquid crystal display device, said touch panel comprising:
        a first transparent substrate provided with a first transparent conductive layer; and
        a second transparent substrate provided with a second transparent conductive layer, said second transparent conductive layer opposing said first transparent conductive layer with a separation distance there between,
    wherein a color of said touch panel has a "b* value" of 2.0 or smaller as specified by the L*a*b* color specification in accordance with JIS Z 8729, and a sum of the b* value of said touch panel and the b* value of a polarization plate of said liquid crystal display device is 3.0 or smaller.

* * * * *